(12) United States Patent
Konzelmann et al.

(10) Patent No.: US 8,418,548 B2
(45) Date of Patent: *Apr. 16, 2013

(54) PLUG-IN SENSOR HAVING AN OPTIMIZED FLOW OUTLET

(75) Inventors: Uwe Konzelmann, Asperg (DE); Christoph Gmelin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 356 days.

This patent is subject to a terminal disclaimer.

(21) Appl. No.: 12/308,490

(22) PCT Filed: Sep. 12, 2007

(86) PCT No.: PCT/EP2007/059551
§ 371 (c)(1),
(2), (4) Date: Sep. 15, 2010

(87) PCT Pub. No.: WO2008/037586
PCT Pub. Date: Apr. 3, 2008

(65) Prior Publication Data
US 2011/0000289 A1    Jan. 6, 2011

(30) Foreign Application Priority Data
Sep. 27, 2006  (DE) .......................... 10 2006 045 657

(51) Int. Cl.
*G01F 1/68* (2006.01)
*G01M 15/00* (2006.01)
(52) U.S. Cl.
USPC ...................................... 73/202.5; 73/114.32
(58) Field of Classification Search .................. None
See application file for complete search history.

(56) References Cited

U.S. PATENT DOCUMENTS

| | | | | |
|---|---|---|---|---|
| 3,916,130 A | * | 10/1975 | Cade | 200/83 C |
| 3,934,454 A | * | 1/1976 | Simo | 73/29.02 |
| 4,278,864 A | * | 7/1981 | De Facci et al. | 219/75 |
| 4,571,996 A | * | 2/1986 | Wakeman et al. | 73/202.5 |

(Continued)

FOREIGN PATENT DOCUMENTS

| | | |
|---|---|---|
| DE | 44 07 209 | 9/1995 |
| DE | 195 47 915 | 6/1997 |

(Continued)

OTHER PUBLICATIONS

International Search Report, PCT International Patent Application No. PCT/EP2007/059551, dated Dec. 17, 2007.

*Primary Examiner* — Harshad R Patel
(74) *Attorney, Agent, or Firm* — Kenyon & Kenyon LLP

(57) ABSTRACT

A plug-in sensor is provided which is suitable for determining at least one parameter of a fluid medium flowing in a main flow direction, especially of an intake air mass of an internal combustion engine flowing through a flow pipe. The plug-in sensor has a plug part that is able to be mounted in the flowing fluid medium, in a specified alignment to the main flow direction. In the plug part, at least one flow channel is provided having at least one inlet opening and at least one outlet opening, in the at least one flow channel at least one sensor is accommodated for determining the at least one parameter. The plug part has a profile at which at least one local pressure minimum sets in in the flowing fluid medium. The at least one outlet opening is situated at the side of the plug part, in the region of the at least one pressure minimum.

24 Claims, 6 Drawing Sheets

U.S. PATENT DOCUMENTS

| | | | |
|---|---|---|---|
| 4,981,035 A | 1/1991 | Hall | |
| 5,925,820 A | 7/1999 | Tank et al. | |
| 6,332,356 B1* | 12/2001 | Hecht et al. | 73/202.5 |
| 6,342,388 B1* | 1/2002 | Van Den Wildenberg | 435/287.1 |
| 6,345,531 B1 | 2/2002 | Mueller et al. | |
| 6,701,781 B1 | 3/2004 | Lutowsky, Jr. et al. | |
| 6,708,561 B2* | 3/2004 | Zurek et al. | 73/204.22 |
| 6,820,474 B2* | 11/2004 | Rueger et al. | 73/114.51 |
| 6,826,955 B2* | 12/2004 | Zurek et al. | 73/204.22 |
| 6,845,660 B2 | 1/2005 | Hecht et al. | |
| 6,845,661 B2* | 1/2005 | Bogdanov et al. | 73/204.22 |
| 7,111,491 B2* | 9/2006 | Kosh et al. | 73/1.57 |
| 7,201,047 B2* | 4/2007 | Kikawa et al. | 73/202.5 |
| 7,523,659 B2* | 4/2009 | Okamoto et al. | 73/202.5 |
| 2003/0070482 A1* | 4/2003 | Straight et al. | 73/204.12 |
| 2004/0206154 A1* | 10/2004 | Kosh et al. | 73/1.64 |
| 2005/0223794 A1* | 10/2005 | Zurek et al. | 73/202.5 |
| 2005/0229672 A1* | 10/2005 | Kosh et al. | 73/1.57 |
| 2010/0064799 A1* | 3/2010 | Mais et al. | 73/204.11 |
| 2011/0000289 A1* | 1/2011 | Konzelmann et al. | 73/114.34 |

FOREIGN PATENT DOCUMENTS

| | | |
|---|---|---|
| DE | 196 01 791 | 7/1997 |
| DE | 198 15 656 | 10/1999 |
| DE | 101 11 840 | 2/2002 |
| DE | 101 54 561 | 5/2002 |
| DE | 101 35 142 | 10/2002 |
| DE | 10 2004 022 271 | 2/2005 |
| DE | 103 48 400 | 2/2005 |
| EP | 0 940 657 | 9/1999 |
| GB | 2 393 254 | 3/2004 |
| JP | 4-128615 | 4/1992 |
| JP | 8-5429 | 1/1996 |
| JP | 2002-503349 | 1/2002 |
| WO | WO 2005/008189 | 1/2005 |

* cited by examiner

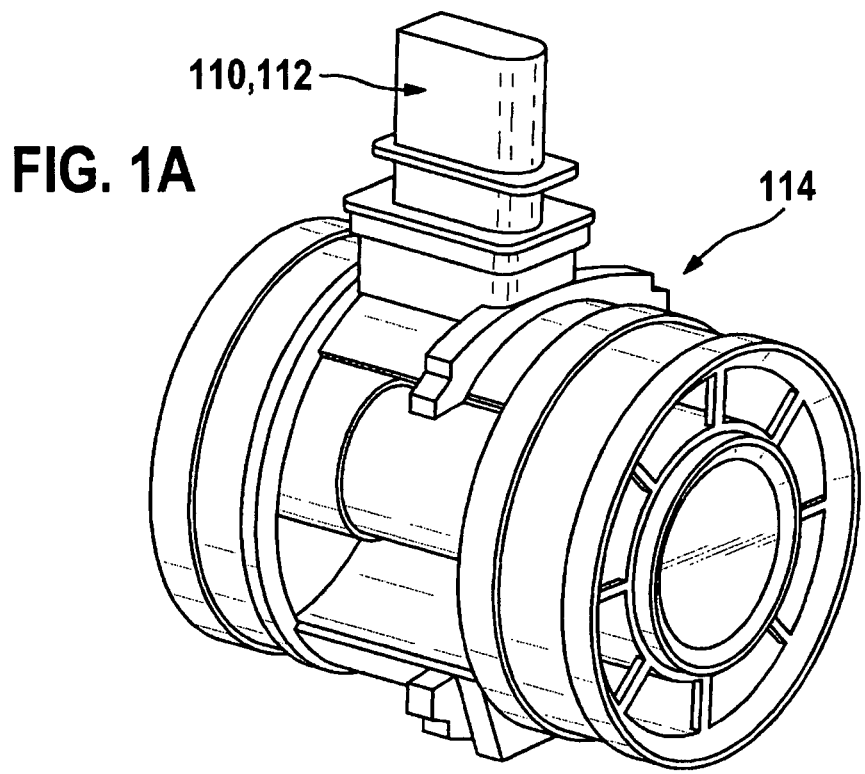
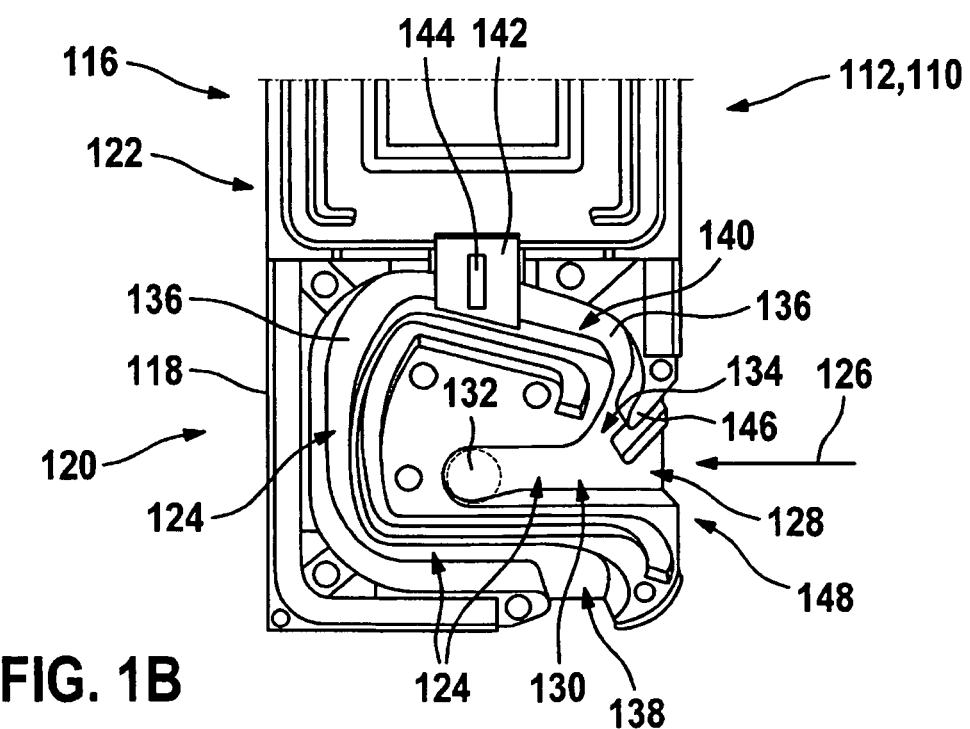

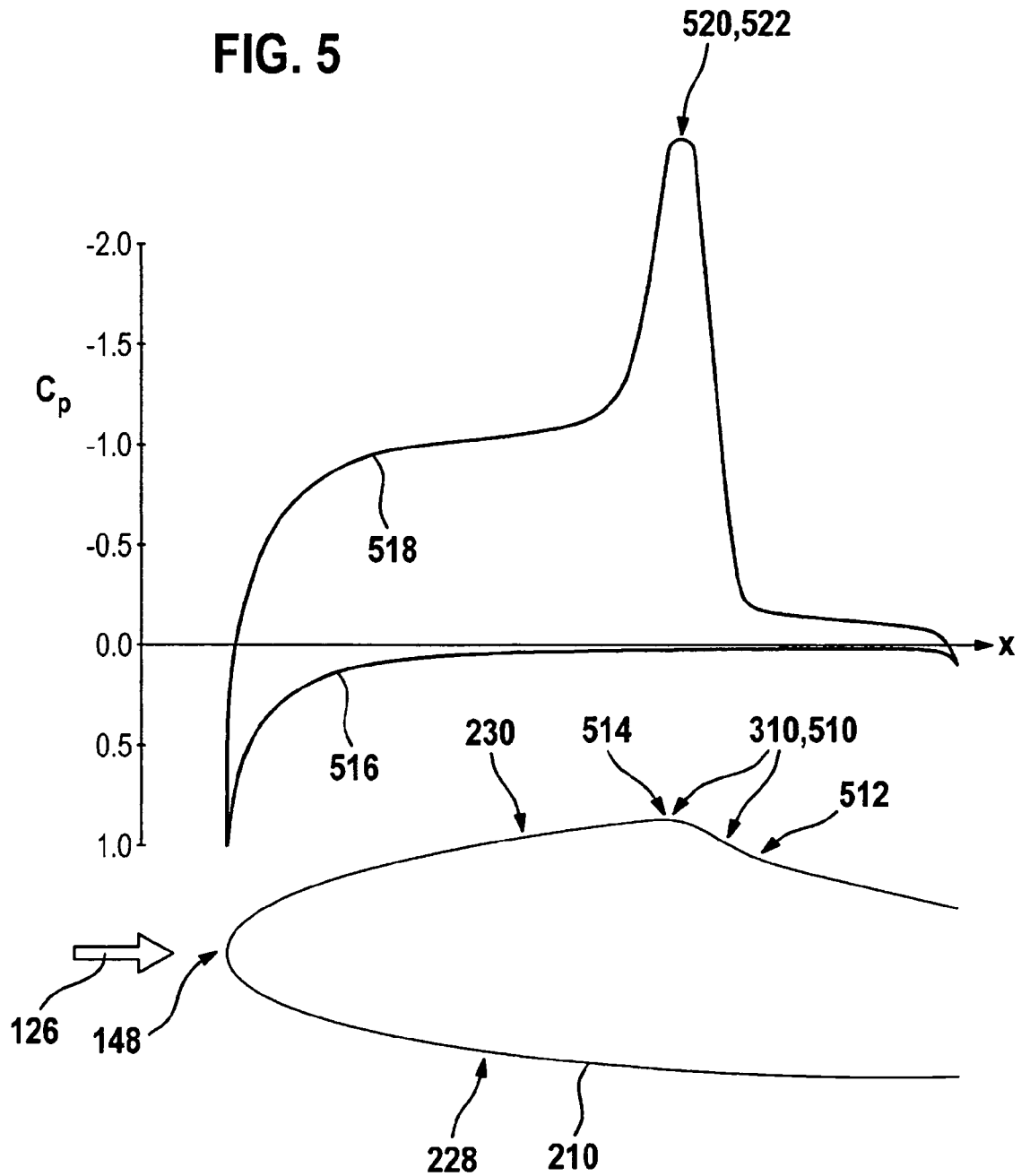

PLUG-IN SENSOR HAVING AN OPTIMIZED FLOW OUTLET

FIELD OF THE INVENTION

The present invention relates to a device for measuring at least one parameter of a flowing fluid medium, in particular, a fluid medium flowing through a flow pipe.

BACKGROUND INFORMATION

In many processes, for instance, in the field of industrial processing engineering, chemistry or machine construction, fluid media, especially masses of gas (e.g. an air mass) having particular properties (such as temperature, pressure, flow speed, mass flow, etc.) have to be supplied in a defined manner. Among these are, in particular, combustion processes, which run under regulated conditions.

An important application example is the combustion of fuel in internal combustion engines of motor vehicles, especially ones having subsequent catalytic exhaust gas purification, in which a certain air mass has to be supplied per unit time in a controlled manner (air mass flow). Various types of sensors are used to measure the air-mass throughput. One conventional sensor type is what is generally known as a hot-film air mass sensor (HFM), which is described in one specific embodiment in German Patent Application No. DE 196 01 791 A1, for example. A sensor chip, which has a thin sensor diaphragm, e.g., a silicon sensor chip, is generally utilized in such hot-film air mass meters. At least one thermal resistor, which is surrounded by two or more temperature measuring resistors (temperature sensors), is typically situated on the sensor diaphragm. In an air flow, that is guided over the diaphragm, the temperature distribution changes, which in turn is detectable by the temperature measuring resistors and is able to be analyzed with the aid of a control and evaluation circuit. Thus, for instance, an air mass flow is able to be determined from a difference in resistance of the temperature measuring resistors. Various other variations of this sensor type are available.

One problem with such a type of conventional sensor described in German Patent Application No. DE 101 11 840 C2, for instance, is that contamination of the sensor element may often occur, such as contamination by water, oil or other fluids, or other types of soiling. As a rule, the sensor chip is used directly in the intake tract of the internal combustion engine or in a bypass to the intake tract of the internal combustion engine. During operation of the internal combustion engine, in this context, water or oil may deposit on the sensor chip, and in this instance, on the sensor diaphragm, in particular. This soiling deposit can lead to an undesired effect on the measuring signal of the sensor, especially since a fluid film on the surface of the sensor affects the thermal conductivity of the surface, which results in a falsification of the measuring signals. Besides in hot film air mass meters, similar problems also occur in other types of sensors, which are used for measuring fluid parameters in a fluid flow.

In order to solve these problems with respect to contamination, and especially to prevent water and oil from reaching the sensor chip, various attempts are known from the related art. One attempt, which is described, for instance, in German Patent Application Nos. DE 101 35 142 A1 or DE 10 2004 022 271 A1, is the use of a so-called "bypass". In this connection, a plug-in sensor is plugged, using a plug part, into an intake pipe, an intake opening being provided at the inflow side in the plug part. A main flow channel is provided in the plug-in sensor, through which a substantial part of the flow flows from the intake opening to a discharge opening. At a branch point, which in German Patent Application No. DE 10 2004 022 271 A1 is additionally developed as a sharp edge (designated also as a "nose"), a bypass channel, in which a sensor chip is situated, branches off from the main channel. The bypass channel eventually opens out into an outlet opening at the lower side of the plug-in sensor. The sharp edge at the branching point of the bypass channel has the effect, in this instance, that water droplets, because of their mass inertia, are able to penetrate into the bypass channel only with difficulty, and that they remain predominantly in the main channel.

However, in the conventional plug-in sensor constructions, it is disadvantageous that the plug-in sensors, because of their aerodynamically unfavorable shape, in many cases cause problems in the intake tract, with regard to a flow resistance-conditioned loss in pressure. In addition, the signal reproducibility of such sensors is comparatively low. For this reason, German Patent Application No. DE 10 2004 022 271 A1 proposes a construction in which a flow diversion part is provided as a separate component, in a fixedly installed manner in the flow pipe. As an alternative, a design of the flow diversion part in one piece with the plug-in sensor is also proposed. Furthermore, a flow-conducting wall is fixedly installed in the flow pipe, which is intended to calm the flow after the plug-in sensor. The construction described in German Patent Application No. DE 10 2004 022 271 A1 is, however, connected with various disadvantages, in practice. One disadvantage is, for instance, that the flow-diversion part is, generally, fixedly installed in a section of the flow pipe. This fixed installation brings on additional costs in the manufacture of these pipe sections, just as does the provision of the additional flow-conducting wall. In the development as one piece, the installation length is also too long for many applications. In addition, the construction described in German Patent Application No. DE 10 2004 022 271 A1 may be further optimized with respect to the pressure drop at the plug-in sensor.

Further problems are that the construction described in German Patent Application Nos. DE 101 35 142 A1 or DE 10 2004 022 271 A1 has only a comparatively low air mass throughput through the bypass channel, so that overall the signal level swings (and, with that, also the signal to noise ratio) are often comparatively unsatisfactory. In addition, in German Patent Application No. DE 101 35 142 A1 and DE 10 2004 022 271 A1 a construction is used in which the discharge opening of the main flow channel is positioned laterally on the plug-in sensor in such a way that outflowing air acts negatively on the course of the flow about the plug-in sensor, and thus additionally increases the flow resistance of the plug-in sensor or is even able to influence the signal characteristic of the plug-in sensor.

SUMMARY

Therefore, an example plug-in sensor is proposed for determining at least one parameter of a fluid medium, flowing in a main flow direction, which avoids the disadvantages outlined above of the conventional plug-in sensors. In particular, the plug-in sensor may be a hot film air mass meter of the type described above, which are suitable for measuring an intake air mass of an internal combustion engine flowing through a flow pipe. Alternatively or in addition, however, other types of measurement principles and plug-in sensors are also used.

According to one example embodiment of the present invention, at least one outlet opening of the at least one plug-in sensor is optimized in its positioning and design, as to flow technology. Various simulation calculations were made for this purpose, which judge the flow behavior in the area of the at least one outlet opening, various shapes and positionings of this at least one outlet opening being investigated.

In view of this, an example plug-in sensor is proposed which has a plug part that is able to be mounted in the flowing fluid medium in a specified orientation to the main flow direction. In the plug part at least one flow channel having at least one inlet opening and at least one outlet opening is provided, in the at least one flow channel, moreover, at least one sensor (for instance, one of the above-described hot film air mass meters/sensor chip) being accommodated for determining the at least one parameter. The plug part has a profile (cross sectional profile), at which at least an at least local pressure minimum sets in in the flowing fluid medium. The at least one outlet opening (that is, at least one of the at least one outlet opening) is situated on the side of the plug part in the area of this at least one pressure minimum.

For the development of the profile of the plug part, one may use, for example, conventional techniques from airplane construction. Thus, one may use an airfoil profile, for instance, which is shaped in such a way that, when the plug part has been mounted in the flowing fluid medium, an asymmetrical flow profile of the fluid medium sets in, having a high pressure side and a low pressure side. Such airfoil profiles are known to one skilled in the art from airplane construction. Such airfoil profiles are developed in such a way that they give rise to a force from the high pressure side towards the low pressure side (lifting force), a pressure minimum appearing in the region of the low pressure side. The at least one outlet opening is preferably situated on the low pressure side, in the region of the at least one pressure minimum, in this case.

To achieve the asymmetrical flow profile, one may use airfoil profiles, for instance, which are mounted into the flowing fluid medium at an angle of incidence α to the main flow direction of the flowing medium. Angles of incidence between 0° and 7°, preferably between 2° and 5°, and particularly preferred at 4° have especially proven themselves, the optimum angle of incidence depending on the exact design of the airfoil profile. Alternatively or in addition, airfoil profiles having a profile curvature may also be used, profile curvatures between 0% and 10%, preferably between 2% and 7%, and especially preferred at 5% having proven themselves.

An idea of an example embodiment of the present invention, positioning the at least one outlet opening in the region of the at least one pressure minimum, causes a particularly high throughput through the at least one flow channel, since the suction effect is particularly great in response to arranging the at least one outlet opening in the region of the at least one pressure minimum. What has especially proven itself in this context is to position the center of the at least one outlet opening (for example, the area center, circle center, or the like) distanced by not more than two widths of the opening of the at least one outlet opening, preferably by not more than one width of the opening, from the point of the at least one pressure minimum. The opening width (D), in this context, is the diameter, in the case of a circular outlet opening, for example. In the case of other designs of the outlet opening (such as square outlet openings, multi-angled outlet openings, etc.) opening widths may similarly be defined, for instance, in the form of edge lengths, or the like.

The at least one flow channel may have at least one main channel and at least one bypass channel, for instance, so as to locate the sensor in the bypass channel that is protected from particles and similar soiling. Thus, the at least one outlet opening may include at least one main flow outlet of the at least one main channel and/or at least one bypass outlet of the at least one bypass channel. One arrangement of the at least one outlet opening laterally on the at least one airfoil profile has proven especially effective, in this context, which realizes one or both of the following arrangements. Thus, particularly the center of the at least one bypass outlet may be situated at or before the at least one pressure minimum. It has proven particularly advantageous if the center of the at least one bypass outlet is situated at a distance between $-0.5\,D_1$ and $2.0\,D_1$, preferably between $0\,D_1$ and $1.0\,D_1$, and especially preferred at $0.5\,D_1$ upstream (that is, counter to the main flow direction) of the at least one pressure minimum. $D_1$ denotes the width of the opening of the at least one bypass outlet, according to the above definition of the term "opening width". In this way, the pressure minimum and the suction effect connected with it may be optimally used to increase the throughput through the at least one bypass channel, which is of consequence for the signal characteristic (such as the signal level swing and/or the signal/noise ratio).

As the second embodiment that may be used alternatively or in addition, the center of the at least one main flow outlet may also be selected to be optimal in its position. Thus, the at least one main flow outlet may be selected to be upstream or downstream of the at least one pressure minimum. In this context this has proven itself especially if the center of the at least one main flow outlet is situated between $0\,D_2$ and $2.0\,D_2$, preferably between $0.5\,D_2$ and $1.5\,D_2$, and especially preferred at $1.0\,D_2$ downstream of the at least one pressure minimum. $D_2$ denotes the width of the opening of the at least one main flow outlet, according to the above definition. Diameters D, $D_1$ and $D_2$ are preferably in the range of between 10% and 20% of profile length L'.

This special arrangement of the at least one main flow outlet may, for instance, also include that the at least one main flow outlet is situated in a detachment region of the flow of the fluid medium, that is, downstream from one or more detachment points of the flow from the airfoil profile. In this way it may be achieved that the main flow flowing through the main channel, at its outflow from the main flow outlet, influences the flow behavior about the plug-in sensors as little as possible.

For the generation of the pressure minimum and/or for the production of spatially fixed detachment points, the plug part may furthermore have on at least one side, preferably only on the low pressure side, at least one detachment element that is designed so as to effect the at least one local pressure minimum in the flowing fluid medium when the plug part is mounted in the flowing fluid medium. The at least one detachment element is preferably able to have a buckle in the contour of the plug part or a step. A continuous profile curve is also possible, for instance, a maximum in the contour of the plug part and/or a point of inflection in the contour. Exemplary embodiments of such detachment elements will be described in greater detail below.

The plug part having the features described above and realized individually or in combination, on the one hand has good diverging properties with respect to water, dust and similar contamination. This is the case especially when using the at least one bypass channel, which branches off from the at least one main channel. Moreover, the plug-in sensor may be designed compactly so that one may install it even in a tight space. The total length of the plug-in sensor may altogether be designed to be comparatively short.

Because of the positioning of the at least one outlet opening in the region of the at least one pressure minimum, the air mass throughput, especially through the bypass channel, is considerably increased (the air mass throughput through the main channel is less relevant for the signal properties).

Because of the positioning of the main flow outlet laterally in an area having detached flow, the interference with the outer flow is minimized, whereby the signal reproducibility of the plug-in sensor is considerably improved. In general, the dynamic response of the plug-in sensor is denoted as pulsation response. In response to pulsating air flow, the air in the bypass channel pulsates right along with it, and the bypass channel functions as compensation for nonlinearities in the characteristics curve of the plug-in sensor and the thermal inertias. If the at least one bypass outlet is positioned at the side of the plug-in sensor, preferably far upstream and close to the inlet opening, pulsation errors may be minimized thereby, since pressure waves in the fluid medium then reach inlet opening and outlet opening at approximately the same time, and thus only lead to comparatively slight air movements in the bypass channel. The plug-in sensor according to the present invention, thus, may have the advantage of good pulsation response, so that in the case of pulsating fluid medium (e.g. air) only a slight deviation comes about between the average at stationary operation and the average at pulsation (that is, a slight pulsation error).

In the case of optimal positioning of the at least one outlet opening it has turned out, however, that still one more considerable disturbance of the surrounding flow of the plug part is able to take place by outflowing fluid medium from the at least one outlet opening. This works out disadvantageously on the pressure drop at the plug-in sensor and on the signal properties. In view of that, the plug-in sensor described above, in one of the example embodiments described, may be further optimized by optimizing the at least one outlet opening in its development. This optimization, in combination with the optimization of positioning the at least one outlet opening, leads to a considerable improvement of the signal characteristics and/or a reduction in the pressure drop at the plug-in sensor.

Thus, it has proven to be advantageous if the at least one outlet opening has at least one flow guidance element. This at least one flow guidance element should be designed in such a way that it guides the fluid medium flowing out from the at least one outlet opening in its outflow direction close to the main flow direction, diverts the outflowing fluid medium in the direction of the main flow direction, and/or diverts the outflowing fluid medium along the contour of the plug part (for instance, along the contour of the airfoil profiles). This is contrary to usual designs of outlet openings, which give rise to an outflow direction that is essentially perpendicular to the respective place on the profile of the plug part. By contrast to that, the at least one flow guidance element has the effect that the outflowing fluid medium optimally joins the flow surrounding the plug part, whereby this flow is disturbed as little as possible.

The at least one outlet opening may particularly be situated transversely to the main flow direction (that is, particularly perpendicular to the main flow direction and/or having its surface normal perpendicular to the respective location on the profile of the plug part. The at least one flow guidance element may then, for instance, include a diverting nose situated at the upstream edge, with respect to the main flow direction, of the at least one outlet opening, which points essentially in the main flow direction. This at least one diverting nose has the effect, from a visual point of view, that the surrounding flow is guided past the at least one outlet opening, as much as possible without additional turbulence or flow interference. At the same time, the at least one diverting nose is able to effect diversion of the outflowing fluid medium, as was described above.

Alternatively or in addition, the at least one flow guidance element may also have a rounding-off or a flattening, in this case preferably at the downstream edge of the at least one outlet opening. By contrast to a sharp downstream edge at the at least one outlet opening, as is common in the related art, the rounding-off and/or flattening effects a gentle diversion of the outflowing fluid medium in the main flow direction, which additionally reduces disturbance.

Simulation calculations have shown, in this context, that the length of the diverting nose (that is, the maximum length of the diverting nose in the direction of the main flow direction) has an optimal range. This optimal range has a length between 0.1 D and 0.4 D, D being the width of the opening (see above) of the at least one outlet opening. It has been shown, in this context, that it may turn out to be favorable if the main flow outlet and the bypass outlet are designed differently, it being preferred that the main flow outlet, in particular, have such a diverting nose.

The at least one rounding-off and/or flattening is able to have its length optimized in the main flow direction, as described above (the length may involve a straight length or an arched length), for example. Thus, a length between 1.0 D and 5.0 D, preferably between 2.0 D and 4.0 D, has proven to be optimal. Again, D designates the width of the opening of the at least one outlet opening.

This design of the at least one outlet opening, in one of its described variants, has the additional advantage of maximizing the throughput of the flowing fluid medium, particularly through the bypass channel. The outer flow of the fluid medium about the plug part is disturbed only minimally. The magnitude of the detachment areas on the plug part may also be minimized, particularly by a suitable design of the at least one main flow outlet, whereby more stable flow conditions about the plug part set in. Overall, the signal noise of the measuring signal of the plug part is considerably improved, and the reproducibility of the measuring signal is increased.

BRIEF DESCRIPTION OF THE DRAWINGS

Exemplary embodiments of the present invention are depicted in the figures and described in greater detail below.

FIG. 1A shows a hot film air mass meter inserted in the intake tract of an internal combustion engine.

FIG. 1B shows an opened hot film air mass meter in a top view.

FIG. 5 shows a pressure profile plotted over a third exemplary embodiment of a plug-in sensor according to the present invention.

DETAILED DESCRIPTION OF EXAMPLE EMBODIMENTS

Figure 2:
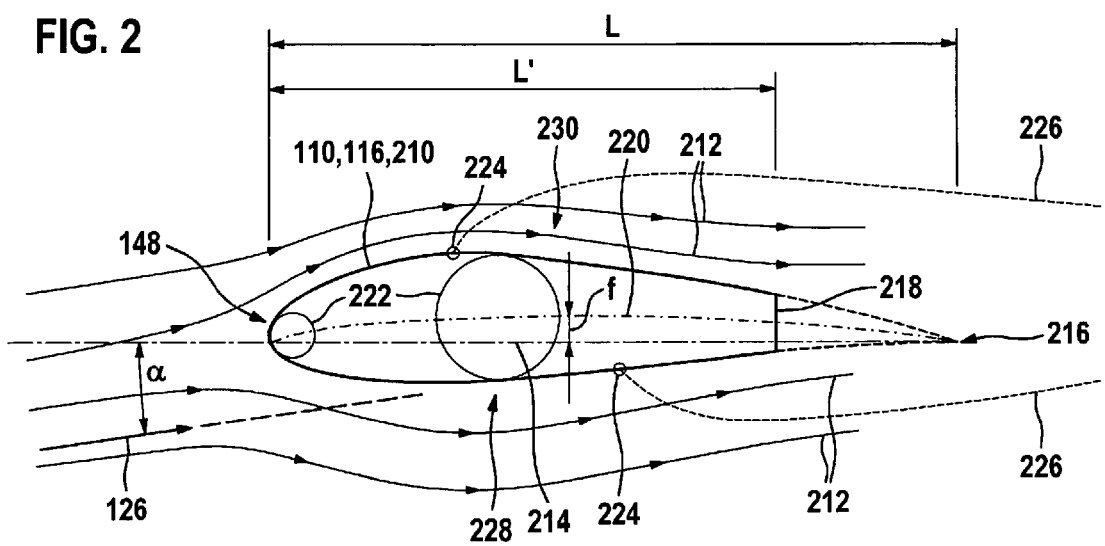
FIG. 2 shows a basic representation of an airfoil profile.

FIG. 1A shows an exemplary embodiment of a conventional plug-in sensor 110, which, in this case, is developed as a hot film air mass meter 112. Hot film air mass meter 112 is inserted into an intake tract 114 of an internal combustion engine, which is not shown in FIG. 1A. Such hot film air mass meters 112 are commercially available. Hot film air mass meter 112 is designed to detect the flow direction of an intake flow and is designed to record the load in internal combustion engines, using gasoline or Diesel fuel injection. The installation of hot film air mass meter 112 is usually made between an air filter and a throttling device, and it is usually installed as a preassembled assembly. Accordingly, plug-in sensor 110 has a plug part 116, which is shown in FIG. 1B in an opened state in a side view, and which projects in FIG. 1A into intake tract 114. It may be seen in FIG. 1B that, in this exemplary embodiment of hot film air mass meter 112, a measuring housing 118 of hot film air mass meter 112 is subdivided into a flow region 120 and an electronics region 122. In flow region 120, a flow channel 124 is accommodated which, in this exemplary embodiment corresponding to the related art, is designed as described in DE 10 2004 022 271 A1. Plug-in sensor 110 has air flowing towards it in a main flow direction 126. The air flows into flow channel 124 through an inlet opening 128. Flow channel 124 has a main channel 130, which is essentially straight, along main flow direction 126, from inlet opening 128 to a main flow outlet 132. Main flow outlet 132 is located, in this context, laterally in a wall of plug part 116.

At a branching 134, a bypass channel 136 branches off from main channel 130, which extends, generally following a curved course around main flow outlet 132, to a bypass outlet 138, that lies on the lower side of plug part 116. In a straight section 140, a chip carrier 142 having a sensor chip inserted into it, extends from electronics region 122 into bypass channel 136. Chip carrier 142 is usually fastened (for instance, injection-molded) to an electronic circuit board accommodated in electronic region 122, which is not shown in FIG. 1B, the electronic circuit board being able to include an evaluation circuit and a control circuit of hot film air mass meter 112.

In order to keep contamination, such as liquid contamination (e.g. water, oil) or solid contamination from sensor chip 144, a sharp-edged nose 146 is provided at branching 134 of bypass channel 136. At this nose, the main flow is separated from the part of the air flowing through bypass channel 136, in such a way that water droplets and other contaminations continue to flow straight ahead through main channel 130, and essentially are unable to reach sensor chip 144.

One problem of the conventional hot film air mass meter 112 is in the design of plug part 116 having an generally rectangular cross section in a sectional plane perpendicular to the plane of the drawing in FIG. 1B. Accordingly, plug part 116 has a leading edge 148 having a plane that is designed generally perpendicular to main flow direction 126. One possible embodiment of the present invention is to design leading edge 148 as a rounded-off leading edge, the rounding being already integrated into plug part 116, and consequently also in plug-in sensor 110. All in all, plug part 116 has an airfoil profile 210 in a sectional plane perpendicular to the plane of the drawing in FIG. 1B, at least in the area of inlet opening 128, which is shown in exemplary fashion in FIG. 2. In the light of the basic representation in FIG. 2, we shall now explain the basic concepts of airfoil profile 210.

Airfoil profile 210 has a rounded-off leading edge 148, which is oriented generally counter to main flow direction 126, when plug part 116 is mounted in intake tract 114 of the internal combustion engine. In the case of an airfoil, leading edge 148 is frequently also designated as stagnation point.

The flow of air about airfoil profile 210 is shown in FIG. 2 symbolically by streamline 212. In this context, it becomes clear that the flow about airfoil profile 210, according to the present invention, is asymmetrical for two types of reason. On the one hand, profile center line 214, on an imaginary line between the apex of leading edge 148 and fictitious rear edge 216 of the airfoil profile, is tilted by an angle α compared to main flow direction 126. Because of that, the flow speed above airfoil profile 210 rises, and below airfoil profile 210 it falls off. Accordingly, the pressure rises below airfoil profile 210 (high pressure side 228) and falls off above airfoil profile 210 (low pressure side 230). This causes the conventional lifting effect of airfoils.

A peculiarity of airfoil profile 210 according to the exemplary embodiment in FIG. 2 is that airfoil profile 210 in fact has a "cut-off" rear 218. This means that the rear is generally perpendicular to profile center line 214, or rather, at a vanishing angle of incidence α, is perpendicular to main flow direction 126. Alternatively to the definition of profile center line 214 drawn in in FIG. 2, this line could also be defined by saying it extends from the apex of leading edge 148 to the midpoint of rear 218.

Besides the asymmetry, mentioned above, of the flow by angle of incidence α relative to main flow direction 126, in the exemplary embodiment of airfoil profile 210, according to FIG. 2, an additional asymmetry is brought on by having an arching of the profile. Thus, in FIG. 2, mean camber line 220 is drawn in, which is obtained geometrically by inscribing inner circles 222 in airfoil profile 210. The totality of the centers of these inner circles 222 forms mean camber line 220. Profile arching means that this mean camber line 220, which would lie on profile center line 214 in response to a perfectly symmetrical airfoil profile 210, now deviates from this profile center line 214. The maximum deviation f of mean camber line 220 from profile center line 214 is designated as profile arching. This is frequently referred to the overall length L (profile length) of airfoil profile 210 and given as a percentage. In this context, the overall length L, as drawn in in FIG. 2, may be measured from the apex of leading edge 148 to fictitious rear edge 216, or, as in the case of the above numerical statements regarding the preferred profile arching, reference may be made to length L', which is measured between the apex of leading edge 148 and rear 218.

Consequently, the profile arching in percent is revealed as f/L'. Because of the profile arching, an additional asymmetry is brought on which even increases the densification of flow lines 212 above airfoil profile 210, and thus the effect described of the increase in speed in this region.

The pattern of flow lines 212 in FIG. 2 is shown in idealized fashion, and in usual airfoil profiles 210 is often not to be found in this manner. Actually, as a rule, a flow detachment appears at respectively one or more separation points on the upper side and partially also on the lower side. In this context, one or more boundary layers 226, which until then had surrounded airfoil profile 210, detach from it, as a rule, and form one or more detachment zones. These points of detachment 224 and the detached boundary layers 226 (also called detachment zones or detachment regions) are indicated symbolically in FIG. 2, it being also indicated that when airfoil profile 210 is engaged, upper detachment point 224 is usually positioned closer to the leading edge than lower detachment point 224. Instead of a well-defined detachment point 224, which, in any case does not represent a point but rather a line perpendicular to the plane of the drawing, detachment points 224 may also be understood to be regions (such as detachment lines) or zones having a finite extension.

Figure 3:
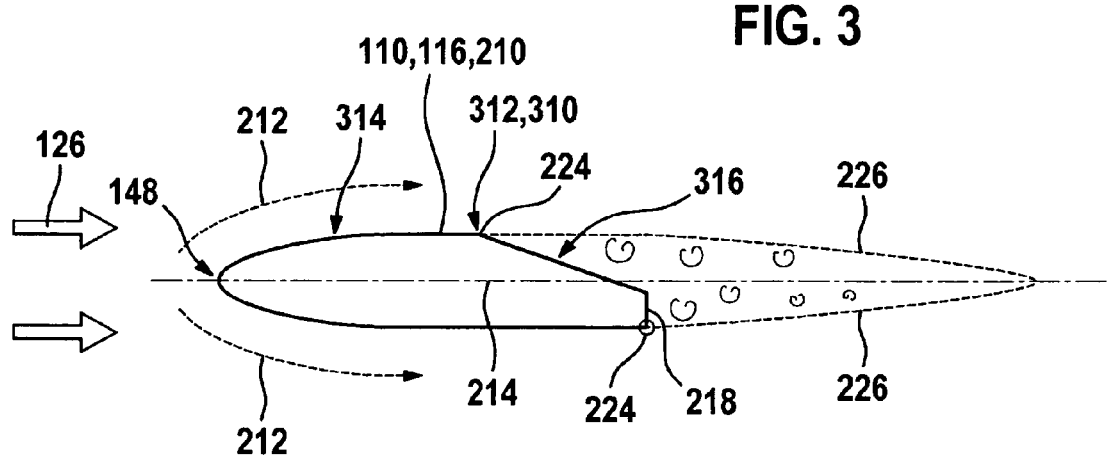
FIG. 3 shows a first exemplary embodiment of an airfoil profile of a plug-in sensor having a beveling.
Figure 4:
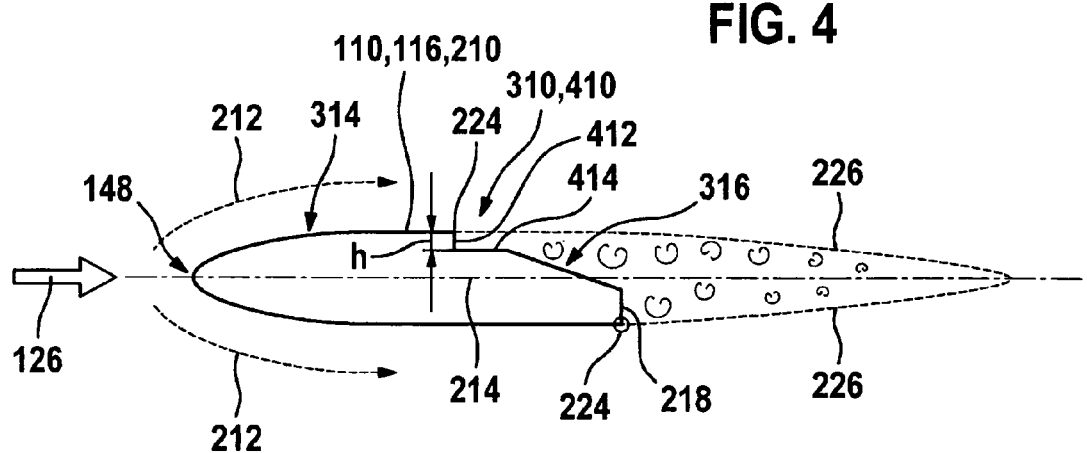
FIG. 4 shows a second exemplary embodiment according to the present invention of a plug-in sensor having a beveling and a step.

One type of problem that was discussed above is that these detachment points 224, at which detached boundary layers 226 form, are unstable in many cases, and may even oscillate. However, the position of the detached boundary layers 226 relative to the position of main flow outlet 132 and of bypass outlet 138 has a sensitive effect on the flow response in flow channel 124, and consequently, on the signal properties of hot film air mass meter 112. According to a further refinement of the present invention, at least one detachment element 310 may therefore be provided, which stabilizes, and preferably fixes the position of detachment point 224 on at least one side of airfoil profile 210, preferably on the upper side (that is, on the side having an increased flow speed). FIGS. 3, 4 and 5 show various exemplary embodiments of such detachment elements 310.

In the exemplary embodiment shown in FIG. 3 of an airfoil profile 210, a buckled profile 312 is provided. As may be seen in FIG. 3, this buckled profile 312 is situated on the upper side of airfoil profile 210, approximately in the middle between leading edge 148 and rear 218, or rather slightly behind this middle. Airfoil profile 210 is designed, in this instance, in such a way that it is curved in front of the buckled profile, that is, upstream, and runs in the curved region 314 at a positive inclination. Behind buckled profile 312, that is, downstream from buckled profile 312, airfoil profile 210 is flattened off in a flattened area 316, and runs there having a negative inclination, generally on an even level towards profile center line 214. Behind that, a cut-off rear 218 is again provided.

This example embodiment of airfoil profile 210 having detachment element 310 has the effect that upper detachment point 224 is generally fixed in detachment element 310. On the lower side of airfoil profile 210, detachment point 224 will normally appear at the corner to vertical rear 218. Detached boundary layers are, in turn, designated in FIG. 3 by reference numeral 226 and are indicated symbolically. The flow about the front part of airfoil profile 210 is uniformly accelerated on both sides as far as detachment points 224, which leads to a very stable, robust flow topology. The detached boundary layers 226 that are created are small in their expansion, are stationary, and consequently do not interfere with the reproducibility of the measurement, or only slightly. If airfoil profile 210 were symmetrical having a close-lying, accelerated flow on both sides, a substantially larger overall thickness would come about in plug part 116, and with that a greater material requirement and a greater pressure drop at plug-in sensor 110.

FIG. 4 shows an exemplary embodiment of an airfoil profile 210 alternative to that in FIG. 3, having a detachment element 310. In contrast to the exemplary embodiment in FIG. 3, no buckled profile 312 is provided in this instance, but rather a stepped profile 410, which is followed again downstream by a flattened area 316, analogously to FIG. 3. Stepped profile 410 is in this case designed as a right angled step, having a first step surface 412 perpendicular to profile center line 214 and a second step surface 414 parallel to profile center line 214. Step height h advantageously amounts to at least 0.5 mm, other step heights, however, also being practicable. Step heights h in the range between 1% and 20% of the whole profile thickness of airfoil profile 210 are particularly preferred. Second step surface 414 typically has a length of between 1.0 and 7.0 mm, overall lengths between 1% and 20% of the profile depth being preferred. The flow is not able to follow the sharp buckle at this step, and detaches from the surface of airfoil profile 210. Detached boundary layers 226 thus always retain almost the same magnitude and shape and remain stable, even when the conditions of flow against the apparatus change. The stable flow topology reduces reactions of the flow upon the signal of hot film air mass meter 112, and leads to a better reproducibility of the measuring signal.

Other example embodiments of step profile 410 are also possible. Thus, first step surface 412 could, for instance, be situated at an angle deviating by 90° from profile center line 214, so that the step would have a slight overhang inclined to the downstream side, having a sharp edge (acute angle) at the upper side. This would further improve the fixing of detachment point 224.

FIG. 5 shows an additional exemplary embodiment of an airfoil profile 210, which also has a detachment element 310. In contrast to the exemplary embodiments in FIGS. 3 and 4, this detachment element 310 has, however, no sharp edges having irregularities in the slope (buckling), but rather a steady curve of the slope of airfoil profile 210. Detachment element 310 according to FIG. 5 shows a mound profile 510 having an additional point of inflection 512. Another steady embodiment is possible, for instance, an embodiment not having an inflection, having only a maximum. The profile according to FIG. 5 shows a maximum 514, that is, a point at which the slope of airfoil profile 210 conducts a steady change from a positive slope to a negative slope (from the upstream to the downstream side).

Detachment elements 310 having a steady curve in the slope have the advantage over the buckling that lesser interferences are caused in the flow of the fluid medium. The entire pressure drop at airfoil profile 210 is less because of that. In addition, detachment elements 310, having a steady curve in its slope, demonstrate a lesser danger of reattaching the detached flows, especially at low flow speeds.

Above airfoil profile 210 in FIG. 5, a pressure profile 516 is plotted on the lower side of airfoil profile 210, and a pressure profile 518 is plotted on the upper side of airfoil profile 210, which were calculated using simulation calculations. The so-called pressure coefficient $c_p$ is plotted here, that is, the dimensionless ratio between the pressure and the ram pressure, as a function of the position along profile center line 214 (which is not shown in these figures). It should be noted at this point that the axis of pressure coefficient $c_p$ is inverted in this case, so that negative values are plotted in the upwards direction.

As may be seen from the plot of the pressure coefficient, pressure profile 516 has in each case a uniform curve on the lower side of airfoil profile 210 (high pressure side 228), whereas pressure profile 518 has an abnormality 520 in each case on the upper side of airfoil profile 210 (low pressure side 230). This abnormality 520 is developed as a minimum 522 in pressure. Correspondingly, in this region of abnormality 520 there occurs a maximum in the flow speed of the air. It has been shown that this abnormality 520, which is spatially fixed by the described contour of airfoil profile 210 with detachment element 310 at airfoil profile 210, is well suited for fixing detachment point 224 on the upper side of airfoil profile 210, so that the flow detachment takes place in a defined manner and without greater fluctuations during operation.

An additional positive side effect of the example shown in FIG. 5 of an airfoil profile 210 is that a greater acceleration of the flow occurs on this lower side of airfoil profile 210, as shown by pressure profile 516 on the lower side. That being so, as a rule all tendencies of the flow to detach itself in this region is reliably prevented.

We should still point out that the positioning outlet openings 132, 138, which is stated below, is not necessarily tied to the use of a detachment element 310. Airfoil profiles 210 may also be used which do not employ such detachment elements 310, which, however, also have a minimum 522 in the pressure curve. Such airfoil profiles 210 may easily be set up and calculated by simulation calculations.

Figure 6A:
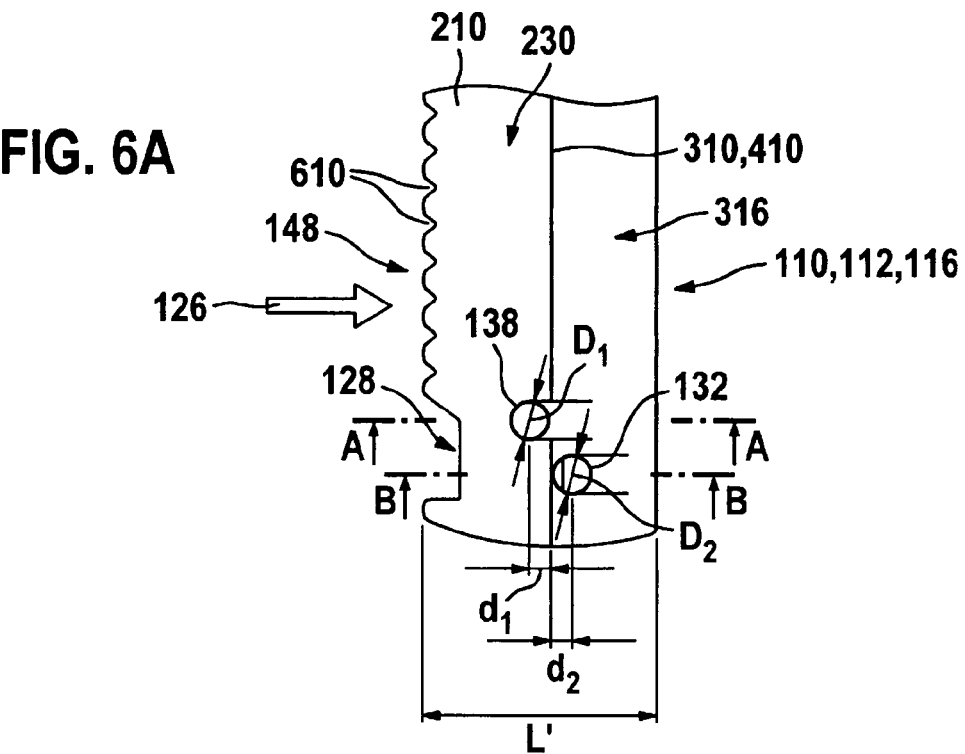
FIG. 6A shows an exemplary embodiment of the positioning of two outlet openings on the side of a plug-in sensor.
Figure 6B:
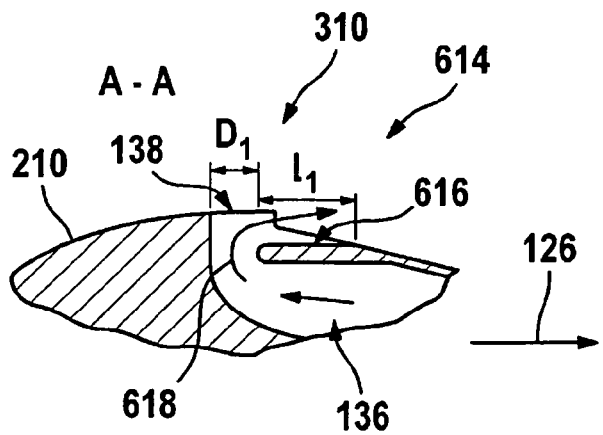
FIG. 6B shows an embodiment of a bypass outlet on the side of a plug-in sensor according to the present invention.
Figure 6C:
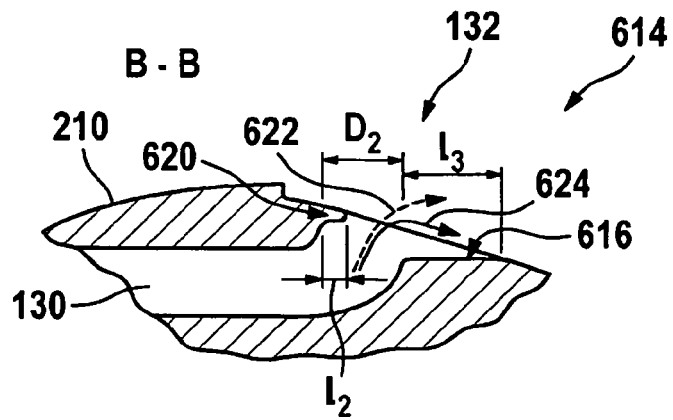
FIG. 6C shows an exemplary embodiment of the design of a main flow outlet of a plug-in sensor according to the present invention.

FIGS. 6A to 6C and 7A to 7B show an exemplary embodiment of a plug-in sensor 110 in the form of an hot film air mass meter 112, which simultaneously realizes both refinements of the present invention described above. In this context, basic descriptions are shown in FIGS. 6A to 6C, whereas in FIGS. 7A and 7B perspective representations of the hot film air mass meter are shown. Therefore, the construction of hot film air mass meter 112 is described, taking an overall view of these figures.

Plug part 116 of plug-in sensor 110, extending into the fluid medium flowing in main flow direction 126, in this exemplary embodiment has an airfoil profile 210 according to the example in FIG. 4, so that approximately at 50 to 60% of profile length L' (measured from leading edge 146) a detachment element 310 is situated in the form of a step profile 410, at which, in the surrounding fluid medium, a sudden change in pressure (pressure minimum) takes place. Downstream from detachment element 310 there is a flattened area 316, analogous to the embodiment in FIG. 4. In addition, at rounded-off leading edge 148 of the plug part, flow grooves 610 are situated which are supposed to generate longitudinal eddies.

Figure 7A:
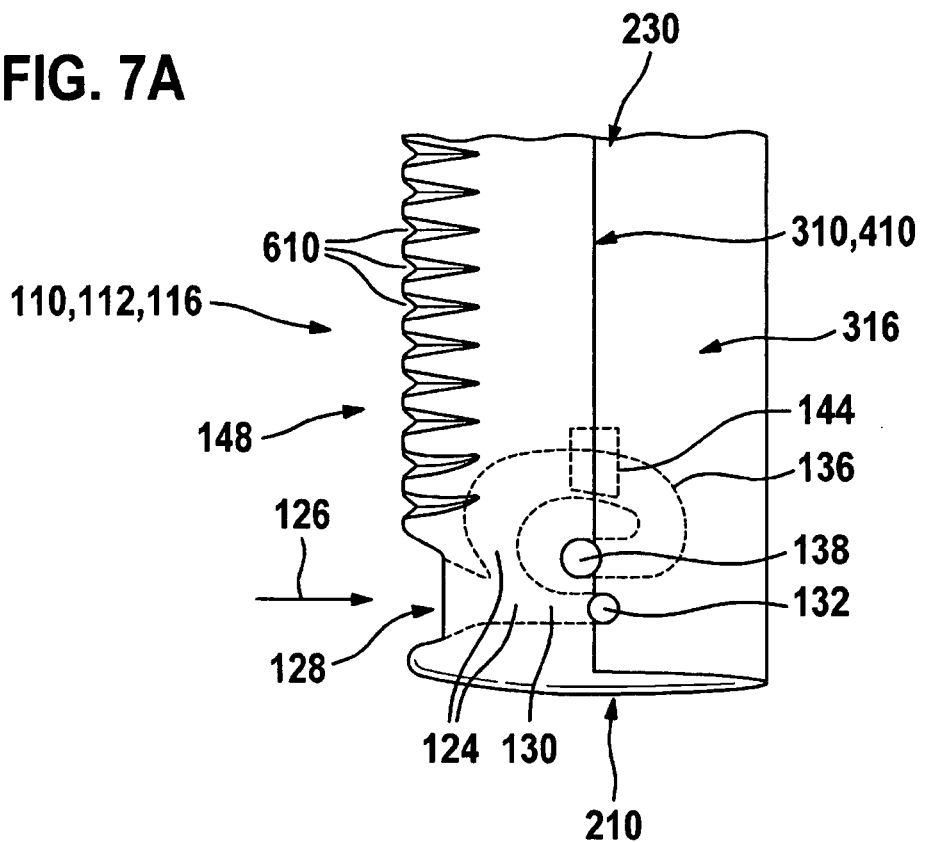
FIG. 7A shows a perspective representation of the plug-in sensor according to FIG. 6A, with a sketched course of the main channel and the bypass channel.

In contrast to the exemplary embodiment corresponding to the related art according to FIG. 1B, in the exemplary embodiment according to FIGS. 6A and 7A, two outlet openings are situated on low pressure side 230, that lie on top in these illustrations, in the area of detachment element 310: Main flow outlet 132 and bypass outlet 138. For the function of these channels 130, 136 as well as of sensor chip 144 we refer to the description of FIG. 1B.

Figure 7B:
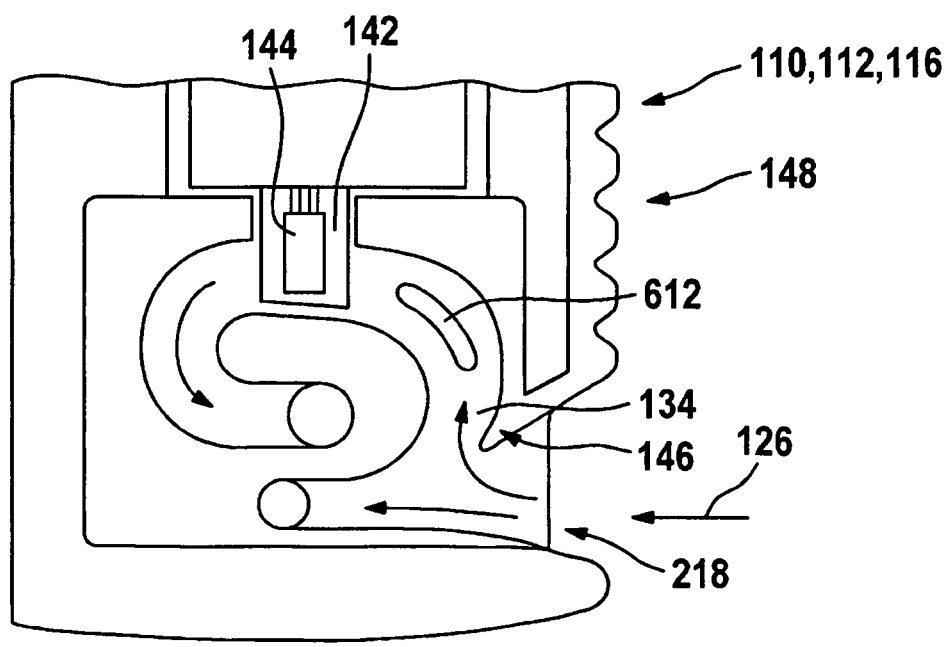
FIG. 7B shows a representation of the plug-in sensor according to FIG. 7A, showing the housing opened.

As may be seen especially in the illustration according to FIG. 6A, outlet openings 132, 138 in this exemplary embodiment are designed as approximately round openings having a diameter $D_1$ (bypass outlet 138) and $D_2$ (main flow outlet 132). Diameter $D_2$ of main flow outlet 132 in this exemplary embodiment is ca. 10% of the profile length L, whereas diameter $D_1$ of bypass outlet 138 was selected slightly bigger, in this example ca. 15% of profile length L'. With respect to this, the representations in FIGS. 6A and 7A are not drawn to scale. The illustration according to FIG. 7B shows once more the course of flow channel 124 and its subdivision into main channel 130 and bypass channel 136, at opened plug part 116, in the direction of view from high pressure side 228 (that is, in the opposite view direction to the direction of view in FIGS. 6A and 7A). In this context one may see that in bypass channel 136, directly behind branching 134 from main channel 130, a guide vane 612 is situated, which is adapted to the curved course of bypass channel 136 in this region, and which is intended to calm the flow in bypass 136.

In the illustration according to FIG. 6A, one may recognize the positioning according to the present invention, of outlet openings 132, 138. Thus, in this exemplary embodiment, bypass outlet 138 is situated at a distance $d_1$ before detachment element 310, at which the pressure minimum appears, which corresponds to approximately one-half of opening width $D_1$ (in this case the diameter) of bypass outlet 138. Analogously, main flow outlet 132 at its center is also at a distance $d_2$ from detachment element 310, but in contrast to bypass outlet 138, on the downstream side of detachment element 310. This arrangement of bypass outlet 138 upstream of detachment element 310 has the effect, on the one hand, that bypass outlet 138 is still situated in the vicinity of the pressure minimum (compare reference numeral 522 in FIG. 5), so that optimally the suction effect of the pressure minimum is utilized in order to maximize the throughput through bypass channel 136. At the same time, the bypass outlet is, however, situated upstream (counter to main flow direction 126) in the vicinity of inlet opening 128, in order to minimize the pulsation error. The distancing shown represents a good compromise between the two effects named.

At the same time, the positioning of main flow outlet 132 upstream of detachment element 310, but still in the vicinity of this flow detachment element 310, has the effect, on the one hand, of a good throughput (which, as a rule, is less important than the throughput through bypass channel 136), and in this context an outlet of the main flow into a region having a detached boundary layer 226 (compare FIG. 4). This positioning therefore has the effect that the main flow exiting from main flow outlet 132 interferes as little as possible with the outer flow around plug part 116, so that the reproducibility of the measurement is optimized.

Besides the optimization of the position of outlet openings 132, 138, the shape of outlet openings 138, 132 may be optimized too, as described above. This is shown in FIGS. 6B and 6C, FIG. 6B being a sectional representation (detailed view) along line A-A through bypass outlet 138 in FIG. 6A, and FIG. 6C being a sectional representation (also a detailed view) along sectional line B-B through main flow outlet 132 in FIG. 6A. One may recognize here that in the case of both outlet openings 132, 138 flow guidance elements 614 are provided. In the case of bypass outlet 132, flow guidance element 614 has a flattening 616 following bypass outlet 132 downstream in airfoil profile 210, which runs approximately parallel to main flow direction 126. This flattening 616 has a length of $l_1$, which is typically in the range between two and four times opening width $D_1$ of bypass outlet 138. This flattening 616 has the effect that the bypass outlet flow, which in FIG. 6B is marked 618, blends into the outer flow without major interference and that a maximum throughput through bypass channel 136 is achieved.

However, for main flow outlet 132, a flow guidance element 614 has proven itself which, besides a downstream flattening 616 includes a diverting nose 620. Whereas flattening 616 (which in the present exemplary embodiment is slightly rounded off) has a length $l_3$, which may lie in the same region as length $l_1$ according to FIG. 6B, diverting nose 620, which extends into main flow outlet 132, has a length $l_2$, which typically lies between the 0.1-fold and the 0.4-fold of opening width $D_2$ of main flow outlet 132. This diverting nose 620, for example, may be implemented by simply adhering to the upstream edge of main flow outlet 132 an adhesive strip extending into main flow outlet 132. This diverting nose 620 has the effect that the main outlet flow is diverted towards the contour of airfoil profile 210, and consequently causes less interference in the surrounding flow. In FIG. 6C, in this instance, the main outlet flow is shown, symbolically, without diverting nose 620, by dashed arrow 622, whereas the main outlet flow is shown by solid arrow 624, in the case of the use of diverting nose 620.

What is claimed is:

1. A plug-in sensor for determining at least one parameter of a fluid medium flowing in a main flow direction of an intake air mass of an internal combustion engine flowing through a flow pipe, the plug-in sensor comprising: a plug part adapted to be mounted in the flowing fluid medium at a predefined alignment to the main flow direction, the plug part having at least one flow channel having at least one inlet opening and at least one outlet opening; and at least one sensor situated in the at least one flow channel, the at least one sensor adapted to determine the at least one parameter; wherein the plug part has a profile at which an at least local pressure minimum sets in the flowing fluid medium, the at least one outlet opening being situated on a side of the plug part in an area of the at least one pressure minimum, wherein the at least one flow channel has at least one main channel and at least one bypass channel, the at least one sensor situated in the bypass channel, wherein the bypass channel branches off from the main channel adjacent to the at least one inlet opening, wherein the at least one outlet opening includes i) at least one main flow outlet of the at least one main channel, and ii) at least one bypass outlet of the at least one bypass channel, wherein the plug part has at least partially an airfoil profile so that when the plug part is mounted in the flowing fluid medium, an asymmetrical flow profile of the fluid medium sets in having a high pressure side and a low pressure side, the at least one outlet opening being situated on the low pressure side.

2. The plug-in sensor as recited in claim 1, wherein the airfoil profile is designed so that: when the plug part is mounted in the flowing fluid medium, the airfoil profile has an angle of incidence α to the main flow direction between 0° and 7°; and the airfoil profile has a profile arching between 0% and 10%.

3. The plug-in sensor as recited in claim 2, wherein the angle of incidence α is between 2° and 5°.

4. The plug-in sensor as recited in claim 3, wherein the angle of incidence α is 4°.

5. The plug-in sensor as recited in claim 2, wherein the profile arching is between 2% and 7%.

6. The plug-in sensor as recited in claim 5, wherein the profile arching is 5%.

7. The plug-in sensor as recited in claim 1, wherein the at least one outlet opening has an opening width D, a center of the at least one outlet opening being situated at a distance of not more than two opening widths from the point of the at least one pressure minimum.

8. The plug-in sensor as recited in claim 7, wherein the center of the at least one outlet opening is not more than one opening width.

9. The plug-in sensor as recited in claim 8, wherein the distance d1 is between 0 D1 and 1.0 D1.

10. The plug-in sensor as recited in claim 8, wherein the distance d2 is between 0.5 D2 and 1.5 D2.

11. The plug-in sensor as recited in claim 1, wherein the at least one outlet opening is situated on the side of at least one airfoil profile; and wherein the plug-in sensor has at least one of the following arrangements of the at least one outlet opening: a center of the at least one bypass outlet is situated at a distance d1, between −0.5 D1 and 2.0 D1 upstream of the at least one pressure minimum, D1 denoting an opening width of the at least one bypass outlet; and a center of the at least one main flow outlet is situated at a distance d2, between 0 D2 and 2.0 D2 downstream from the at least one pressure minimum, D2 denoting an opening width of the at least one main flow outlet.

12. The plug-in sensor as recited in claim 11, wherein the distance d1 is 0.5 D1.

13. The plug-in sensor as recited in claim 10, wherein the distance d2 is 1.0 D2.

14. The plug-in sensor as recited in claim 11, wherein the at least one main flow outlet is situated in a region of a detached boundary layer of the flow of the fluid medium.

15. The plug-in sensor as recited in claim 1, wherein the plug part has at least one detachment element on at least one side, the at least one detachment element effecting the at least local pressure minimum in the flowing fluid medium when the plug part is mounted in the flowing fluid medium; and the at least one detachment element include one of the following elements: a buckle in a contour of the plug part, a step in the contour of the plug part, a maximum in a contour of the plug part, and a point of inflection in the contour of the plug part.

16. The plug-in sensor as recited in claim 15, wherein the at least one side is only the low pressure side.

17. The plug-in sensor as recited in claim 1, wherein the at least one outlet opening has at least one flow guidance element, the at least one flow guidance element being designed to have the fluid medium flowing out of the at least one outlet opening at least one of: i) approach the main flow direction in its outflow direction, ii) divert the fluid medium into the main flow direction, and iii) direct the fluid medium along a contour of the plug part.

18. The plug-in sensor as recited in claim 17, wherein the at least one outlet opening is situated transversely to the main flow direction and the at least one flow guidance element includes at least one of the following elements: a diverting nose situated at an upstream edge, with respect to the main flow direction, of the at least one outlet opening, the diverting nose pointing in the main flow direction; at least one of a rounding-off and a flattening of the downstream edge, with respect to the main flow direction, of the at least one outlet opening.

19. The plug-in sensor as recited in claim 18, wherein the diverting nose has a maximum length l2 in the main flow direction of between 0.05 D and 0.5 D, D being an opening width of the at least one outlet opening and the at least one outlet opening.

20. The plug-in sensor as recited in claim 19, wherein the maximum length l2 is between 0.1 D and 0.4 D.

21. The plug-in sensor as recited in claim 18, wherein the at least one of the rounding-off and the flattening of the downstream edge is provided, which has a length l3 in the main flow direction of between 1.0 D and 5.0 D, D being an opening width of the at least one outlet opening.

22. The plug-in sensor as recited in claim 21, wherein length l3 is between 2.0 D and 4.0 D.

23. The plug-in sensor as recited in claim 21, wherein a profile of the plug part has a profile length L', a diameter D of the at least one outlet opening amounting to between 10% and 20% of the profile length L'.

24. The plug-in sensor as recited in claim 1, wherein the bypass channel branches off from the main channel between the at least one inlet opening and an outlet opening of the main channel.

* * * * *